United States Patent
Iseyama

(10) Patent No.: US 6,192,232 B1
(45) Date of Patent: Feb. 20, 2001

(54) EMERGENCY CALL CONTROL APPARATUS FOR MOBILE COMMUNICATION SYSTEM

(75) Inventor: Takayuki Iseyama, Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/150,662

(22) Filed: Sep. 10, 1998

(30) Foreign Application Priority Data

Feb. 26, 1998 (JP) .................................................. 10-044947

(51) Int. Cl.$^7$ .................................................. H04M 11/00
(52) U.S. Cl. .......................... 455/404; 455/439; 370/331; 370/332
(58) Field of Search .................................... 455/404, 436, 455/437, 438, 439, 450, 516, 517, 455, 521; 370/331, 332

(56) References Cited

U.S. PATENT DOCUMENTS

| | | | |
|---|---|---|---|
| 5,465,388 | * 11/1995 | Zicker | 455/404 |
| 5,574,977 | * 11/1996 | Joseph et al. | 455/450 |
| 5,797,093 | * 8/1998 | Houde | 455/404 |
| 5,862,485 | * 1/1999 | Linneweh, Jr. et al. | 455/450 |

FOREIGN PATENT DOCUMENTS

| | | |
|---|---|---|
| 1-154639 | 6/1989 | (JP) . |
| 4-290098 | 10/1992 | (JP) . |
| 6-245256 | 9/1994 | (JP) . |
| 9-200119 | 7/1997 | (JP) . |

* cited by examiner

Primary Examiner—Nay Maung
Assistant Examiner—Quochien B. Vuong
(74) Attorney, Agent, or Firm—Helfgott & Karas, PC.

(57) ABSTRACT

An emergency call control apparatus for a mobile communication system does not disconnect, in a handoff, an emergency call from a mobile station in a service zone to which the mobile station has moved even when the radio channels are congested in the service zone. When a channel securement requesting unit in a first base station controller receives an emergency call from the mobile station, the channel securement requesting unit requests a second base station controller associated with a service zone adjacent to a service zone of a first base station to secure a radio channel. In the second base station controller, a securing unit secures an idle radio channel. When the mobile station engaging in an emergency call moves into the adjacent service zone, a connection requesting unit in the first base station controller requests the second base station controller to make a radio connection between the mobile station and the second base station through a radio channel secured by the securing unit.

21 Claims, 9 Drawing Sheets

EMERGENCY CALL CONTROL APPARATUS FOR MOBILE COMMUNICATION SYSTEM

BACKGROUND OF THE INVENTION

(1) Field of the Invention

The present invention relates to an emergency call control apparatus for a mobile communication system, and more particularly to an emergency call control apparatus which is capable of smoothly effecting handoff control even when a mobile station moves from a service zone into another service zone while engaging in an emergency call in a mobile communication system.

More specifically, the present invention is concerned with an emergency call control apparatus for a CDMA (Code Division Multiple Access) mobile communication system.

Handoff control refers to a capability to maintain communication with a mobile station in a call without interruptions when the mobile station moves from a service zone to another service zone while engaging in the call, and is also called "handover".

(2) Description of the Related Art

Generally, the number of radio channels available between mobile stations and a base station in a mobile communication system is very small. The limited number of available radio channels may possibly result in a situation where an emergency call from a mobile station cannot be connected when there is a request to connect such an emergency call to a police station or a fire department from the mobile station to the base station while the radio channels are being congested. Heretofore, various efforts have been made to connect an emergency call with priority in order to avoid such a situation.

The conventional attempts are based on the assumption that a mobile station which has made a request to connect an emergency call in a service zone does not move from that service zone while the mobile station is engaging in the emergency call. No consideration has been given to possible movement of the mobile station to another service zone during the emergency call. Therefore, although an emergency call from a mobile station in a first service zone can be connected with priority regardless of the radio channels being congested in the first service zone, when the mobile station moves to a second service zone adjacent to the first service zone, the emergency call can possibly be disconnected if the radio channels are congested in the second service zone. Stated otherwise, in a handoff, a radio channel is not assigned with priority to the emergency call in the second service zone to which the mobile station has moved.

SUMMARY OF THE INVENTION

It is therefore an object of the present invention to provide an emergency call control apparatus for a mobile communication system which will not disconnect, in a handoff, an emergency call from a mobile station in a service zone to which the mobile station has moved even when the radio channels are congested in the service zone.

To achieve the above object, there is provided an emergency call control apparatus for a mobile communication system including at least a first base station having a service zone, a first base station controller for controlling the first base station, an exchange for mobile communications which is connected to the first base station controller, a second base station having a service zone adjacent to the service zone of the first base station, and a second base station controller for controlling the second base station, the second base station controller being connected to the exchange. The emergency call control apparatus has channel securement requesting means in the first base station controller, for requesting at least the second base station controller through the exchange to secure a radio channel when a request to originate an emergency call is received from a mobile station through the first base station, securing means in the second base station controller, for securing an idle radio channel according to a request from the channel securement requesting means, and connection requesting means in the first base station controller, for requesting the second base station controller through the exchange to make a radio connection between the mobile station and the second base station through a radio channel secured by the securing means when the mobile station needs a handoff to the second base station.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

A mobile communication system which incorporates an emergency call control apparatus according to a first embodiment of the present invention will be described below with reference to FIG. 1.

Figure 1:
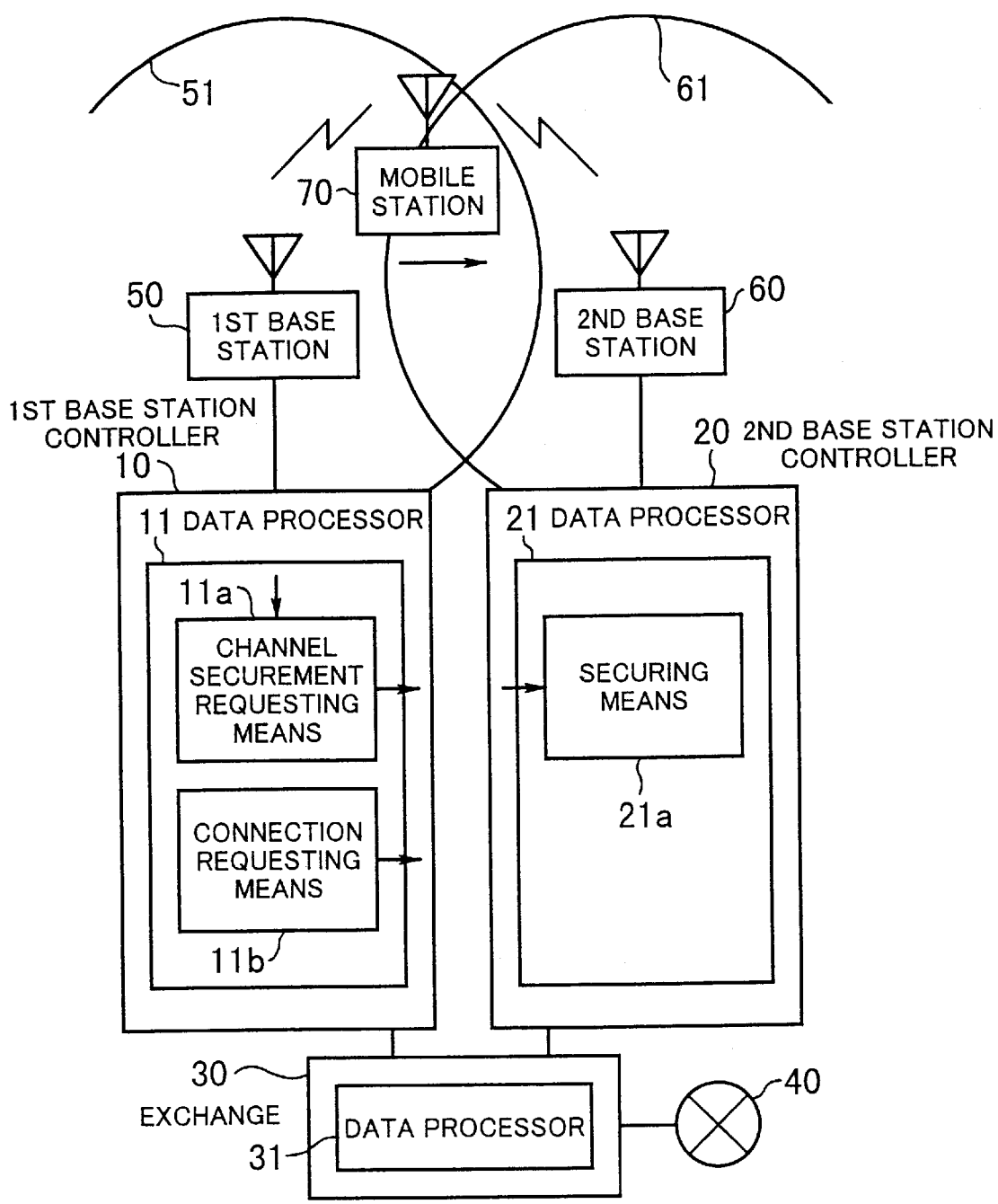
FIG. 1 is a block diagram of a mobile communication system which incorporates an emergency call control apparatus according to a first embodiment of the present invention.

As shown in FIG. 1, the mobile communication system comprises a first base station 50 having a service zone 51, a first base station controller 10 for controlling the first base station 50, an exchange 30 for mobile communications which is connected to the first base station controller 10, a second base station 60 having a service zone 61 adjacent to the service zone 51, and a second base station controller 20 for controlling the second base station 60, the second base station controller 20 being connected to the mobile communication exchange 30.

The emergency call control apparatus comprises a channel securement requesting means 11a in the first base station controller 10, for requesting, through the exchange 30, at least the second base station controller 20 to secure a radio channel when a request to originate an emergency call is received from a mobile station 70 through the first base station 50, a securing means 21a in the second base station controller 20, for securing an idle radio channel according to a request from the channel securement requesting means 11a, and a connection requesting means 11b in the first base station controller 10, for requesting the second base station controller 20 through the exchange 30 to make a radio connection between the mobile station 70 and the second base station 60 through a radio channel secured by the securing means 21a when the mobile station 70 needs a handoff to the second base station 60.

It is assumed that the mobile station 70 is positioned within the service zone 51 of the first base station 50, and sends an emergency call to the first base station 50. Based on the call, a radio channel is connected with priority between the mobile station 70 and the first base station 50 according to a conventional process.

According to the present invention, when the channel securement requesting means 11a in the first base station controller 10 receives a request to originate an emergency call from the mobile station 70, the channel securement requesting means 11a requests, through the exchange 30, a base station controller which controls a base station having a service zone adjacent to the service zone 51 of the first base station 50, to reserve a radio channel. Though there can exist a plurality of base station controllers which receive such a request, the second base station controller 20 which has the service zone 61 and controls the second base station 60 will be described below.

In response to the request to reserve a radio channel, the securing means 21a in the second base station controller 20 secures an idle radio channel. Specifically, the securing means 21a reserves a radio channel in case the movable station 70 which has originated the emergency call moves into the service zone 61.

It is assumed that the movable station 70 which is engaging in the emergency call moves into the service zone 61, requiring a handoff from the first base station 50 to the second base station 60. The connection requesting means 11b in the first base station controller 10 requests the second base station controller 20 through the exchange 30 to make a radio connection between the mobile station 70 and the second base station 60 via the radio channel secured by the securing means 21a. The second base station controller 20 then establishes a radio connection between the mobile station 70 and the second base station 60 via the radio channel which has been secured.

Therefore, even if the radio channels are congested in the service zone to which the mobile station 70 moves, the emergency call is maintained in that service zone.

The mobile communication system which incorporates the emergency call control apparatus according to the first embodiment of the present invention will be described in greater detail.

As shown in FIG. 1, the first base station controller 10 includes a data processor 11 comprising a CPU, a RAM, a ROM, an I/O, etc. The channel securement requesting means 11a and the connection requesting means 11b shown in FIG. 1 are actually functions that are performed when the data processor 11 executes a predetermined program. Similarly, the second base station controller 20 includes a data processor 21 comprising a CPU, a RAM, a ROM, an I/O, etc. The securing means 21a shown in FIG. 1 is actually a function that is performed when the data processor 21 executes a predetermined program.

A public communication network 40 is connected to the exchange 30, which also includes a data processor 31 comprising a CPU, a RAM, a ROM, an I/O, etc.

The mobile communication system which incorporates the emergency call control apparatus according to the first embodiment of the present invention comprises a CDMA mobile communication system.

A processing sequence that is carried out by the data processors 11, 21 will be described below with reference to FIGS. 2 and 3.

Figure 2:
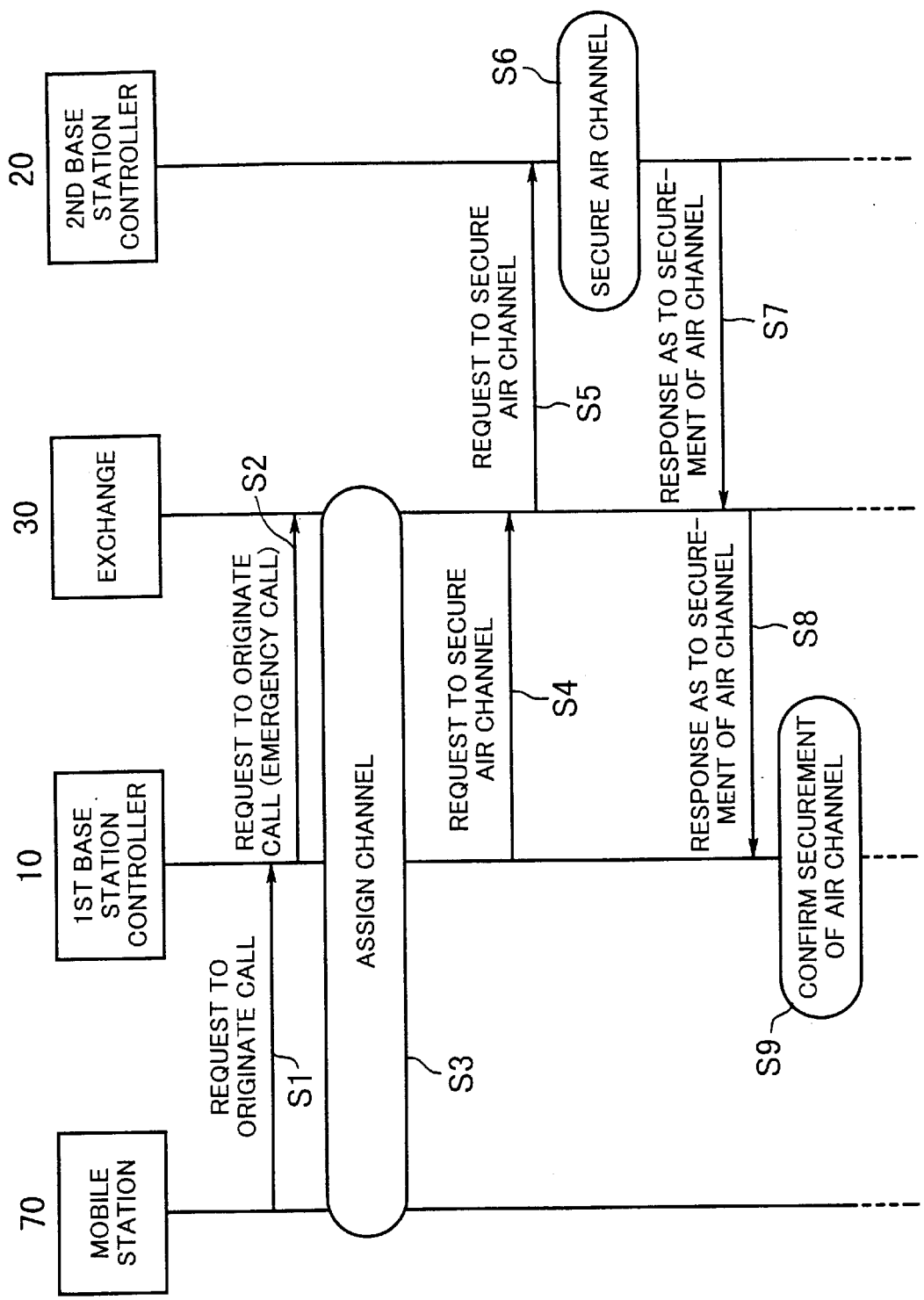
FIG. 2 is a sequence diagram of a former half of an emergency call connection process and a handoff process which are carried out by the mobile communication system shown in FIG. 1.
Figure 3:
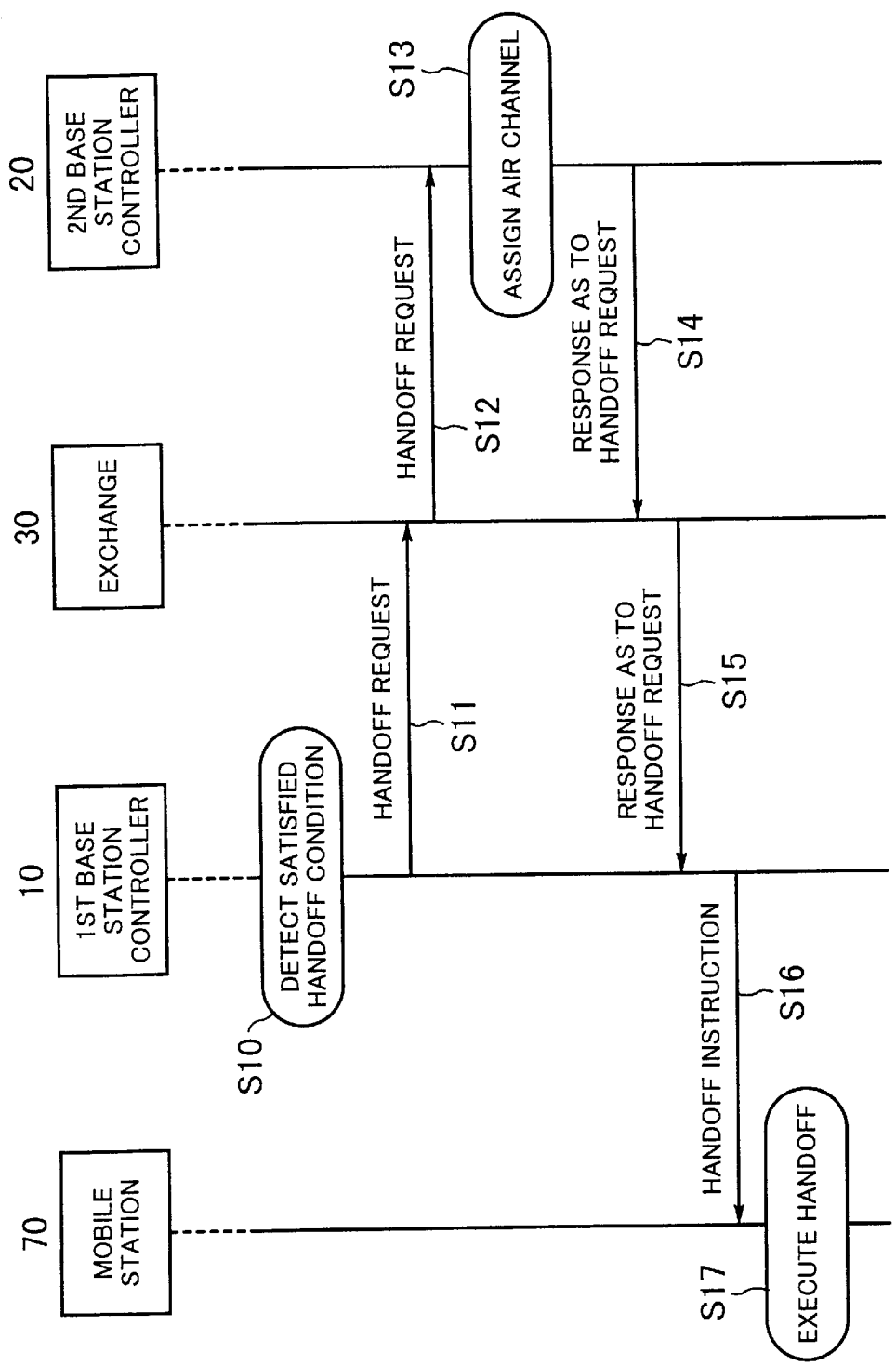
FIG. 3 is a sequence diagram of a latter half of the emergency call connection process and the handoff process which are carried out by the mobile communication system shown in FIG. 1.

FIGS. 2 and 3 show former and latter halves, respectively, of an emergency call connection process and a handoff process which are carried out by the mobile communication system shown in FIG. 1. These processes will be described below with respect to sequence steps represented by sequence numbers each with a prefix S.

When the first base station controller 10 receives a request to originate an emergency call from the mobile station 70 through the first base station 50 (S1), the first base station controller 10 transmits the request to originate an emergency call to the exchange 30 (S2). As is conventional, a radio channel is assigned with priority between the mobile station 70 and the first base station 50, and a wired channel is assigned between the first base station controller 10 and the exchange 30. As a result, the mobile station 70 is connected through the first base station 50, the first base station controller 10, the exchange 30, and the public communication network 40 (which may be a private communication circuit) to a terminal of a called party, e.g., a terminal in a police station or a fire department, and starts communicating with the called party (S3).

After the above channels have been assigned, the first base station controller 10 sends a message to the exchange 30, requesting the securement of a radio channel (air channel) (S4). The message is accompanied by information (frequency, etc.) relative to the radio channel assigned between the mobile station 70 and the first base station 50.

The exchange 30 transfers the message to a certain base station controller associated with a service zone adjacent to the service zone 51 of the first base station 50 (S5). The certain base station controller is a base station controller which controls a base station having a service zone adjacent to the service zone 51. In this case, the second base station controller 20 which is associated with the service zone 61 adjacent to the service zone 51 will be described below. If there are a plurality of base station controllers associated with respective service zones adjacent to the service zone 51, then sequence steps S5–S9 are executed with respect to each of those base station controllers.

At this stage, on the assumption that the mobile station 70 will move into the service zone 61, requiring a wired channel between the exchange 30 and the second base station controller 20 for the emergency call, a wired channel may be secured in advance for the emergency call between the exchange 30 and the second base station controller 20.

However, since the number of available wired channels is generally greater than the number of available radio channels, such a wired channel may not necessarily need to be secured in advance.

In response to the message requesting the securement of a radio channel, the second base station controller 20 selects radio channels whose frequency is the same as the frequency of the radio channel assigned between the mobile station 70 and the first base station 50, from radio channels available to the second base station 60 which has the service zone 61, chooses a presently idle radio channel from the selected radio channels, and secures the chosen idle radio channel for the emergency call (S6). The second base station controller 20 will not allow the secured radio channel to be used by other mobile stations until it receives a notice to cancel the securement of the radio channel.

After the second base station controller 20 has selected radio channels whose frequency is the same as the frequency of the radio channel assigned between the mobile station 70 and the first base station 50, if all those selected radio channels are occupied and no idle radio channel is available, then the second base station controller 20 selects radio channels whose frequency is different from the frequency of the radio channel assigned between the mobile station 70 and the first base station 50, chooses a presently idle radio channel from the selected radio channels, and secures the chosen idle radio channel for the emergency call.

Then, the second base station controller 20 sends a response message indicating that an idle radio channel has been secured to the exchange 30 (S7), which transfers the response message to the first base station controller 10 (S8). From the response message, the first base station controller 10 confirms that a radio channel has been secured between the mobile station 70 and the second base station 60 (S9).

Thereafter, the first base station controller 10 monitors the mobile station 70 for its communication status to ascertain if the communication status of the mobile station 70 satisfies a handoff execution condition (S10). The handoff execution condition is a condition for starting a process for a mobile station to change from a base station having a service zone in which the mobile station moves to a base station having a service zone into which the mobile station will move. For example, the handoff execution condition is satisfied when the level of a radio wave transmitted from the mobile station 70 and received by the first base station 50 has fallen below a predetermined level. If the communication status of the mobile station 70 satisfies the handoff execution condition, the first base station controller 10 sends a message requesting a handoff to a service zone into which the mobile station will move, to the exchange 30 (S11). If the communication status of the mobile station 70 does not satisfy the handoff execution condition and the mobile station 70 finishes the emergency call, i.e., if the mobile station 70 finishes the emergency call while staying in the same service zone, then a disconnecting instruction is sent from the mobile station 70 through the first base station 50 and the first base station controller 10 to the exchange 30. The exchange 30 then sends a notice to cancel the securement of a radio channel to all base station controllers which have secured radio channels for the emergency call from the mobile station 70.

When the exchange 30 receives the message requesting a handoff, the exchange 30 transfers the received message to a base station controller having a service zone into which the mobile station 70 will move (S12). In this case, if the mobile station 70 moves into the service zone 61, the exchange 30 transfers the received message to the second base station controller 20. At this time, if a wired channel has been secured in advance for the emergency call between the exchange 30 and the second base station controller 20, the secured wired channel is established for the emergency call from the mobile station 70.

The second base station controller 20 assigns the radio channel secured in the sequence step S6 between the mobile station 70 and the second base station 60 (S13), thus making a radio connection between the mobile station 70 and the second base station 60. The mobile station 70 is now able to communicate with the terminal of the called party through the second base station 60, the second base station controller 20, the exchange 30, and the public communication network 40 (which may be a private communication circuit). The mobile station 70 does not communicate with the called party yet.

The second base station controller 20 sends a response message indicating that a handoff can be carried out to the exchange 30 (S14), which transfers the response message to the first base station controller 10 (S15). The first base station controller 10 then sends a handoff instruction to the mobile station 70 (S16).

The mobile station 70 then carries out a handoff (S17). That is, if there has been secured an idle radio channel whose frequency is the same as the frequency of the radio channel assigned between the mobile station 70 and the first base station 50 in the sequence step S6, then the mobile station 70 carries out a soft handoff. Specifically, according to the CDMA process, if the mobile station 70 uses the same frequency for a handoff, then the mobile station 70 can communicate with the first base station 50 and the second base station 60 simultaneously. The mobile station 70 selects a communication path of better communication quality from the two communication paths thus available. Accordingly, an undesirable instantaneous communication cutoff can be avoided upon a handoff.

If there has been secured an idle radio channel whose frequency is different from the frequency of the radio channel assigned between the mobile station 70 and the first base station 50 in the sequence step S6, then the mobile station 70 effects a hard handoff. Specifically, the mobile station 70 first cuts off the communication with the first base station 50, and then starts communicating with the second base station 60. In this case, an instantaneous communication cutoff cannot be avoided upon a handoff.

According to the first embodiment, as described above, when a mobile station moves from a service zone into another service zone while engaging in an emergency call, the emergency call is maintained in the other service zone even if the radio channels are congested in the other service zone.

In the first embodiment, in the sequence steps S1, S2, when the first base station controller 10 receives a request to originate an emergency call from the mobile station 70, the first base station controller 10 immediately transmits the request to originate an emergency call to the exchange 30. However, such a process may be modified as follows: Two levels according to different degrees of emergency are established for emergency calls. Only when the mobile station 70 transmits a request to originate an emergency call of the level corresponding to the higher degree of emergency, i.e., only when the mobile station 70 transmits a request to originate an emergency call of the level which seeks reliable maintenance of communications even if the mobile station 70 moves into an adjacent service zone, the first base station controller 10 transmits the request to originate an emergency call to the exchange 30.

In the first embodiment, the mobile communication system comprises a CDMA mobile communication system. Therefore, an idle radio channel whose frequency is the same as the frequency of the radio channel assigned between the mobile station 70 and the first base station 50 is secured at first in the sequence step S6. However, the principles of the first embodiment are not limited to a CDMA mobile communication system, but are also applicable to a general mobile communication system. If the first embodiment is applied to a general mobile communication system, then an idle radio channel whose frequency different from the frequency of the radio channel assigned between the mobile station 70 and the first base station 50 is secured at first in the sequence step S6, and a handoff is carried out in the sequence step S17.

A mobile communication system according to a second embodiment of the present invention will be described below.

The mobile communication system according to the second embodiment is basically the same in structure as the mobile communication system according to the first embodiment. Therefore, the description of the mobile communication system according to the first embodiment shown in FIG. 1 is referred to for the mobile communication system according to the second embodiment.

According to the second embodiment, a processing sequence executed by the data processor 11, the data processor 21, and the data processor 31 differs from the processing sequence executed by those of the first embodiment.

Figure 4:
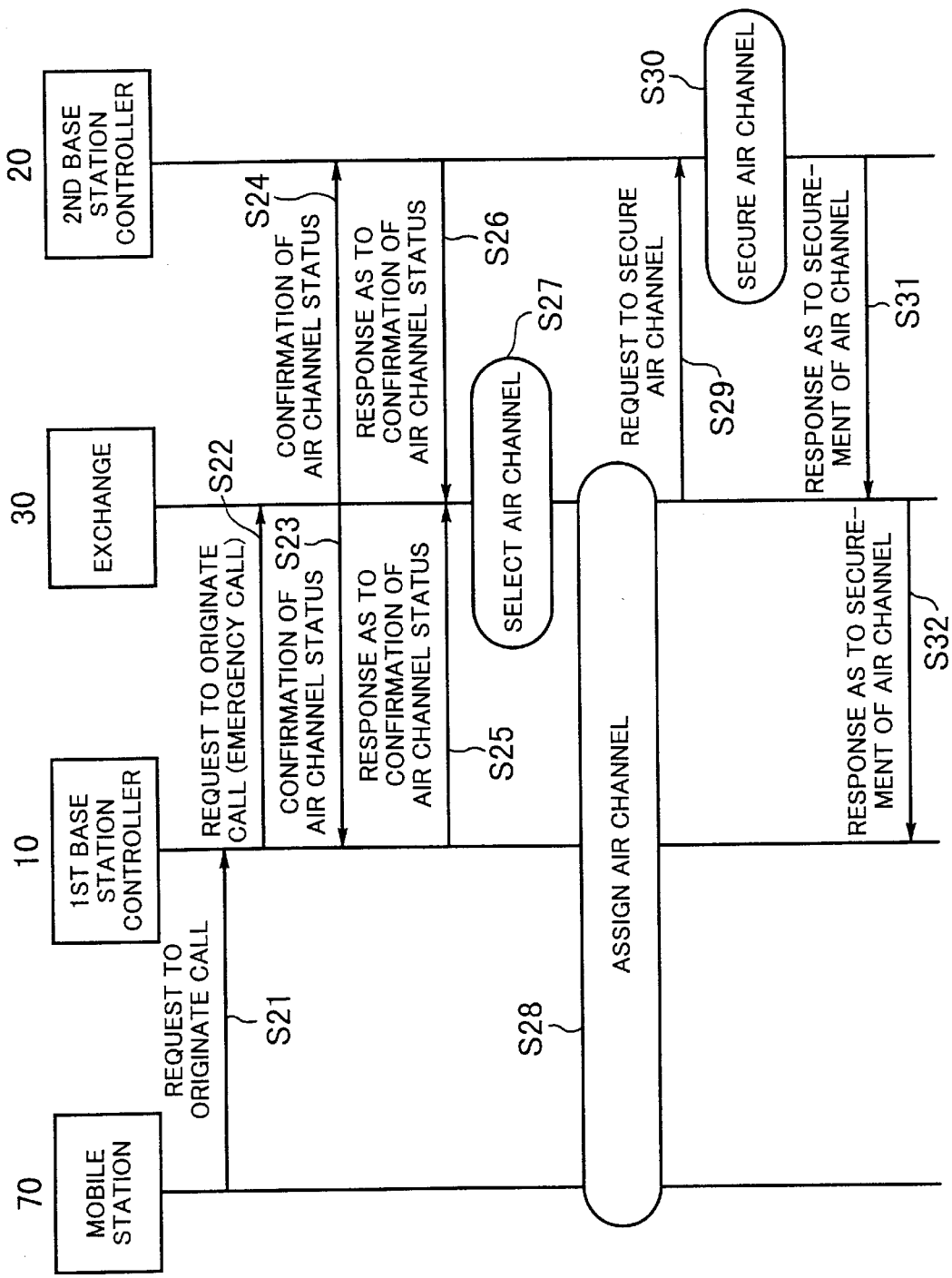
FIG. 4 is a sequence diagram of a former half of an emergency call connection process and a handoff process which are carried out by a mobile communication system according to a second embodiment of the present invention.
Figure 5:
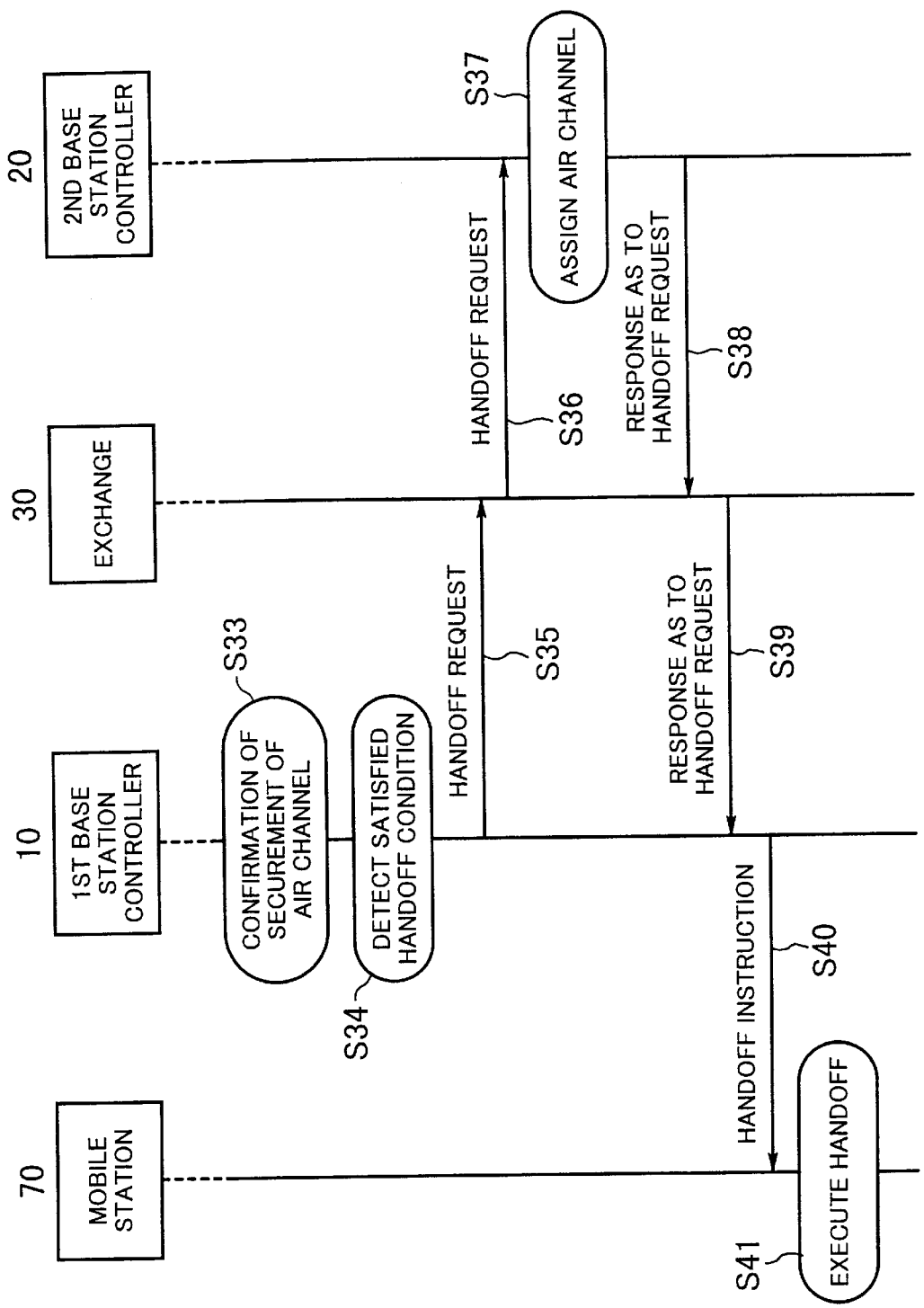
FIG. 5 is a sequence diagram of a latter half of the emergency call connection process and the handoff process which are carried out by the mobile communication system according to the second embodiment of the present invention.

FIGS. 4 and 5 show former and latter halves, respectively, of an emergency call connection process and a handoff process which are carried out by the mobile communication system according to the second embodiment. These processes will be described below with respect to sequence steps represented by sequence numbers each with a prefix S.

When the first base station controller 10 receives a request to originate an emergency call from the mobile station 70 through the first base station 50 (S21), the first base station controller 10 transmits the request to originate an emergency call to the exchange 30 (S22).

The exchange 30 sends a confirmation message to the first base station controller 10, requesting the first base station controller 10 to indicate presently idle radio channels that are available to the first base station 50 (S23). Similarly, the exchange 30 also sends a confirmation message to a certain base station controller associated with a service zone adjacent to the service zone 51 of the first base station 50, requesting the certain base station controller to indicate presently idle radio channels that are available to the base station controlled by the certain base station controller (S24). The certain base station controller is a base station controller which controls a base station having a service zone adjacent to the service zone 51. In this case, the second base station controller 20 which is associated with the service zone 61 adjacent to the service zone 51 will be described below. If there are a plurality of base station controllers associated with respective service zones adjacent to the service zone 51, then sequence steps S24, S26, S27, S29–S33 are executed with respect to each of those base station controllers.

The first base station controller 10 sends the exchange 30 a response message indicating presently idle radio channels that are available to the first base station 50 (S25). Alternatively, the sequence steps S23, S25 may be dispensed with, and the first base station controller 10 may send the exchange 30 the request to originate an emergency call and a message indicating presently idle radio channels that are available to the first base station 50 in the sequence step S22.

Similarly, the second base station controller 20 sends the exchange 30 a response message indicating presently idle radio channels that are available to the second base station 60 (S26).

The exchange 30 selects one of the presently idle radio channels that are available to the first base station 50. The selected idle radio channel is referred to as a "first channel". The exchange 30 also selects idle radio channels whose frequency is the same as the frequency of the first channel from the presently idle radio channels that are available to the second base station 60, and chooses one of the selected idle radio channels (S27). The chosen idle radio channel is referred to as a "second channel". After the exchange 30 has selected radio channels whose frequency is the same as the frequency of the first channel, if all those selected radio channels are occupied and no idle radio channel is available, then the exchange 30 selects radio channels whose frequency is different from the frequency of the first channel, and chooses an idle radio channel from the selected radio channels. In this case, the chosen idle radio channel is also referred to as a "second channel".

The first channel is assigned between the mobile station 70 and the first base station 50, and a wired channel is assigned between the first base station controller 10 and the exchange 30. As a result, the mobile station 70 is connected through the first base station 50, the first base station controller 10, the exchange 30, and the public communication network 40 (which may be a private communication circuit) to a terminal of a called party, e.g., a terminal in a police station or a fire department, and starts communicating with the called party (S28).

After the above channels have been assigned, the exchange 30 sends a message to the second base station controller 20, requesting the securement of the second channel (S29). The second base station controller 20 then secures the second channel for the emergency call (S30). The second base station controller 20 will not allow the secured second channel to be used by other mobile stations until it receives a notice to cancel the securement of the second channel.

Other sequence steps S31–S41 shown in FIGS. 4 and 5 are identical to the sequence steps S7–S17 shown in FIGS. 2 and 3, and will not be described below.

According to the second embodiment, as described above, when a mobile station moves from a service zone into another service zone while engaging in an emergency call, the emergency call is maintained in the other service zone even if the radio channels are congested in the other service zone.

In the second embodiment, in the sequence steps S21, S22, when the first base station controller 10 receives a request to originate an emergency call from the mobile station 70, the first base station controller 10 immediately transmits the request to originate an emergency call to the exchange 30. However, such a process may be modified as follows: Two levels according to different degrees of emergency are established for emergency calls. Only when the mobile station 70 transmits a request to originate an emergency call of the level corresponding to the higher degree of emergency, the first base station controller 10 transmits the request to originate an emergency call to the exchange 30.

In the second embodiment, the mobile communication system comprises a CDMA mobile communication system.

Therefore, an idle radio channel whose frequency is the same as the frequency of the radio channel (first channel) assigned between the mobile station 70 and the first base station 50 is secured at first in the sequence step S27. However, the principles of the second embodiment are not limited to a CDMA mobile communication system, but are also applicable to a general mobile communication system. If the second embodiment is applied to a general mobile communication system, then an idle radio channel whose frequency different from the frequency of the first channel is secured at first in the sequence step S27, and a handoff is carried out in the sequence step S41.

A mobile communication system according to a third embodiment of the present invention will be described below.

The mobile communication system according to the third embodiment is basically the same in structure as the mobile communication system according to the first embodiment. Therefore, the description of the mobile communication system according to the first embodiment shown in FIG. 1 is referred to for the mobile communication system according to the third embodiment.

According to the third embodiment, a processing sequence executed by the data processor 11, the data processor 21, and the data processor 31 differs from the processing sequence executed by those of the first embodiment.

Figure 6:
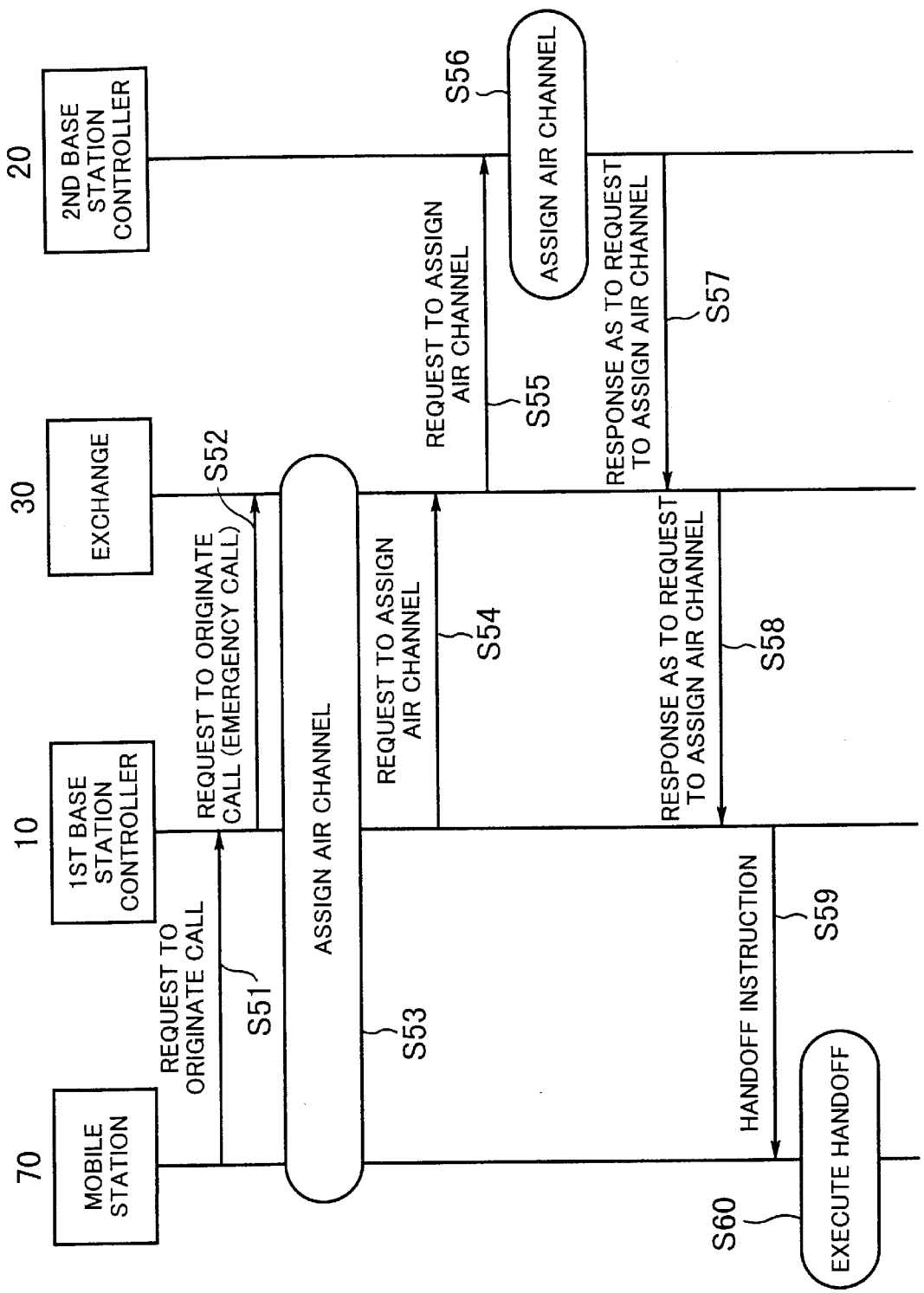
FIG. 6 is a sequence diagram of an emergency call connection process and a handoff process which are carried out by a mobile communication system according to a third embodiment of the present invention.

FIG. 6 shows an emergency call connection process and a handoff process which are carried out by the mobile communication system according to the third embodiment. These processes will be described below with respect to sequence steps represented by sequence numbers each with a prefix S.

When the first base station controller 10 receives a request to originate an emergency call from the mobile station 70 through the first base station 50 (S51), the first base station controller 10 transmits the request to originate an emergency call to the exchange 30 (S52). As is conventional, a radio channel is assigned with priority between the mobile station 70 and the first base station 50, and a wired channel is assigned between the first base station controller 10 and the exchange 30. As a result, the mobile station 70 is connected through the first base station 50, the first base station controller 10, the exchange 30, and the public communication network 40 (which may be a private communication circuit) to a terminal of a called party, e.g., a terminal in a police station or a fire department, and starts communicating with the called party (S53).

After the above channels have been assigned, the first base station controller 10 sends a message to the exchange 30, requesting the assignment of a radio channel (S54). The message is accompanied by information (frequency, etc.) relative to the radio channel assigned between the mobile station 70 and the first base station 50.

The exchange 30 transfers the message to a certain base station controller associated with a service zone adjacent to the service zone 51 of the first base station 50 (S55). The certain base station controller is a base station controller which controls a base station having a service zone adjacent to the service zone 51. In this case, the second base station controller 20 which is associated with the service zone 61 adjacent to the service zone 51 will be described below. If there are a plurality of base station controllers associated with respective service zones adjacent to the service zone 51, then sequence steps S55–S58 are executed with respect to each of those base station controllers.

In response to the message requesting the assignment of a radio channel, the second base station controller 20 selects radio channels whose frequency is the same as the frequency of the radio channel assigned between the mobile station 70 and the first base station 50, from radio channels available to the second base station 60 which has the service zone 61, chooses a presently idle radio channel from the selected radio channels, and assigns the chosen idle radio channel for the emergency call (S56). A radio connection is now established between the mobile station 70 and the second base station 60. The mobile station 70 is now able to communicate with the terminal of the called party through the second base station 60, the second base station controller 20, the exchange 30, and the public communication network 40 (which may be a private communication circuit). The mobile station 70 does not communicate with the called party yet.

Then, the second base station controller 20 sends a response message indicating that the assignment of an idle radio channel is completed to the exchange 30 (S57), which transfers the response message to the first base station controller 10 (S58). In response to the response message, the first base station controller 10 sends a handoff instruction to the mobile station 70 (S59).

The mobile station 70 then carries out a handoff (S60). That is, since the radio channels having the same frequency have been established between the mobile station 70 and the base stations, the mobile station 70 can communicate with the first base station 50, the second base station 60, and base stations controlled by other base station controllers simultaneously. The mobile station 70 selects a communication path of better communication quality from the communication paths thus available. Accordingly, an undesirable instantaneous communication cutoff can be avoided upon a handoff. If the mobile station 70 moves into the service zone 61, then the radio channel between the mobile station 70 and the second base station 60 is selected as a communication path of best communication quality.

In the third embodiment, in the sequence steps S51, S52, when the first base station controller 10 receives a request to originate an emergency call from the mobile station 70, the first base station controller 10 immediately transmits the request to originate an emergency call to the exchange 30. However, such a process may be modified as follows: Two levels according to different degrees of emergency are established for emergency calls. Only when the mobile station 70 transmits a request to originate an emergency call of the level corresponding to the higher degree of emergency, the first base station controller 10 transmits the request to originate an emergency call to the exchange 30.

A mobile communication system according to a fourth embodiment of the present invention will be described below.

The mobile communication system according to the fourth embodiment is basically the same in structure as the mobile communication system according to the first embodiment. Therefore, the description of the mobile communication system according to the first embodiment shown in FIG. 1 is referred to for the mobile communication system according to the fourth embodiment.

According to the fourth embodiment, a processing sequence executed by the data processor 11, the data processor 21, and the data processor 31 differs from the processing sequence executed by those of the first embodiment.

Figure 7:
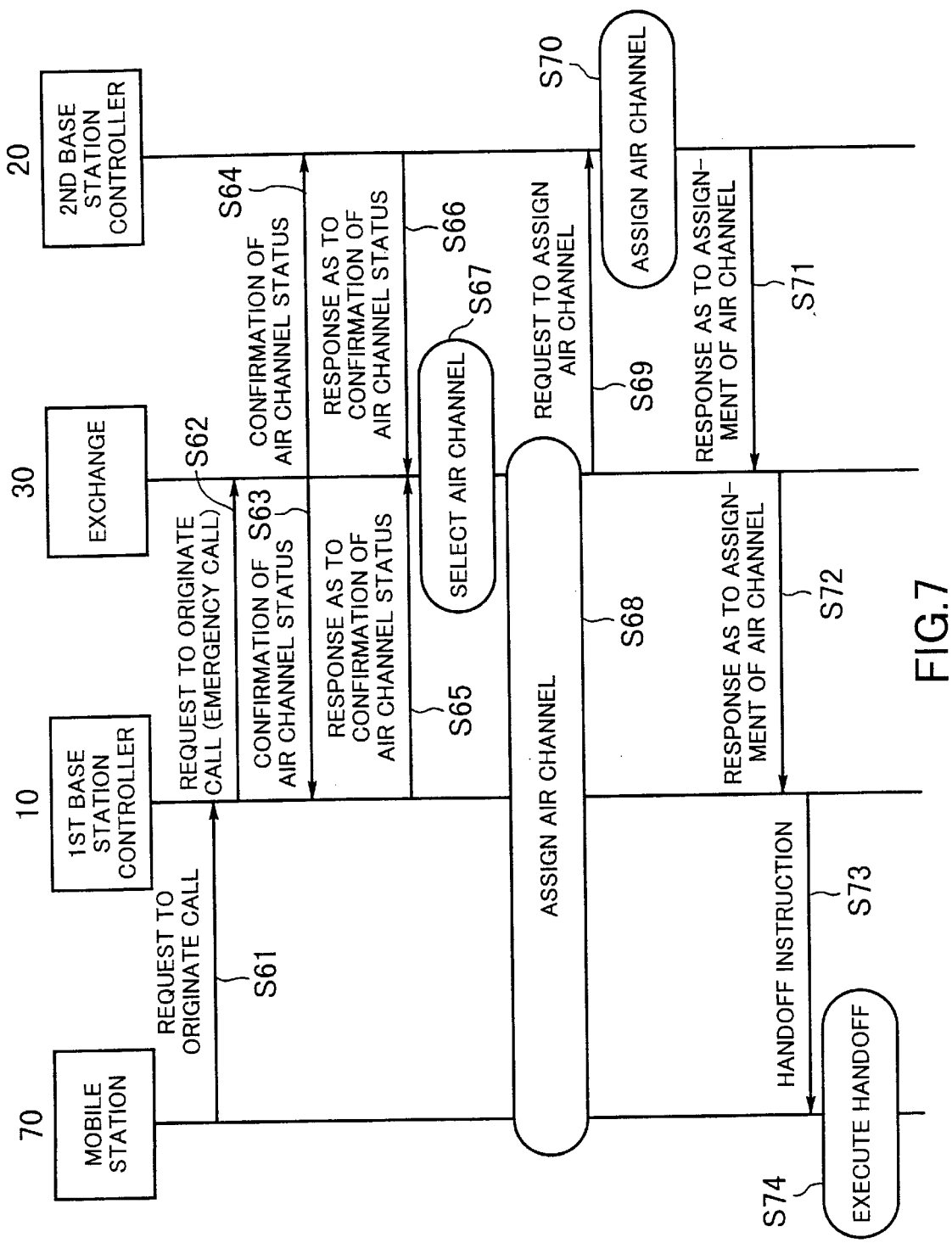
FIG. 7 is a sequence diagram of an emergency call connection process and a handoff process which are carried out by a mobile communication system according to a fourth embodiment of the present invention.

FIG. 7 shows an emergency call connection process and a handoff process which are carried out by the mobile communication system according to the fourth embodiment. These processes will be described below with respect to sequence steps represented by sequence numbers each with a prefix S.

When the first base station controller 10 receives a request to originate an emergency call from the mobile station 70 through the first base station 50 (S61), the first base station controller 10 transmits the request to originate an emergency call to the exchange 30 (S62).

The exchange 30 sends a confirmation message to the first base station controller 10, requesting the first base station controller 10 to indicate presently idle radio channels that are available to the first base station 50 (S63). Similarly, the exchange 30 also sends a confirmation message to a certain base station controller associated with a service zone adjacent to the service zone 51 of the first base station 50, requesting the certain base station controller to indicate presently idle radio channels that are available to the base station controlled by the certain base station controller (S64). The certain base station controller is a base station controller which controls a base station having a service zone adjacent to the service zone 51. In this case, the second base station controller 20 which is associated with the service zone 61 adjacent to the service zone 51 will be described below. If there are a plurality of base station controllers associated with respective service zones adjacent to the service zone 51, then sequence steps S64, S66, S67, S69–S72 are executed with respect to each of those base station controllers.

The first base station controller 10 sends the exchange 30 a response message indicating presently idle radio channels that are available to the first base station 50 (S65). Similarly, the second base station controller 20 sends the exchange 30 a response message indicating presently idle radio channels that are available to the second base station 60 (S66).

The exchange 30 selects one of the presently idle radio channels that are available to the first base station 50. The selected idle radio channel is referred to as a "first channel". The exchange 30 also selects idle radio channels whose frequency is the same as the frequency of the first channel from the presently idle radio channels that are available to the second base station 60, and chooses one of the selected idle radio channels (S67). The chosen idle radio channel is referred to as a "second channel".

The first channel is assigned between the mobile station 70 and the first base station 50, and a wired channel is assigned between the first base station controller 10 and the exchange 30. As a result, the mobile station 70 is connected through the first base station 50, the first base station controller 10, the exchange 30, and the public communication network 40 (which may be a private communication circuit) to a terminal of a called party, e.g., a terminal in a police station or a fire department, and starts communicating with the called party (S68).

After the above channels have been assigned, the exchange 30 sends a message to the second base station controller 20, requesting the assignment of the second channel (S69). The second base station controller 20 makes a radio connection between the mobile station 70 and the second base station 60 through the second channel (S70). The mobile station 70 is now able to communicate with the terminal of the called party through the second base station 60, the second base station controller 20, the exchange 30, and the public communication network 40 (which may be a private communication circuit). The mobile station 70 does not communicate with the called party yet.

Then, the second base station controller 20 sends a response message indicating that the assignment of an idle radio channel is completed to the exchange 30 (S71), which transfers the response message to the first base station controller 10 (S72). In response to the response message, the first base station controller 10 sends a handoff instruction to the mobile station 70 (S73).

The mobile station 70 then carries out a handoff (S74). That is, since the radio channels having the same frequency have been established between the mobile station 70 and the base stations, the mobile station 70 can communicate with the first base station 50, the second base station 60, and base stations controlled by other base station controllers simultaneously. The mobile station 70 selects a communication path of better communication quality from the communication paths thus available. Accordingly, an undesirable instantaneous communication cutoff can be avoided upon a handoff. If the mobile station 70 moves into the service zone 61, then the radio channel between the mobile station 70 and the second base station 60 is selected as a communication path of best communication quality.

In the fourth embodiment, in the sequence steps S61, S62, when the first base station controller 10 receives a request to originate an emergency call from the mobile station 70, the first base station controller 10 immediately transmits the request to originate an emergency call to the exchange 30. However, such a process may be modified as follows: Two levels according to different degrees of emergency are established for emergency calls. Only when the mobile station 70 transmits a request to originate an emergency call of the level corresponding to the higher degree of emergency, the first base station controller 10 transmits the request to originate an emergency call to the exchange 30.

A mobile communication system according to a fifth embodiment of the present invention will be described below.

The mobile communication system according to the fifth embodiment is basically the same in structure as the mobile communication system according to the first embodiment. Therefore, the description of the mobile communication system according to the first embodiment shown in FIG. 1 is referred to for the mobile communication system according to the fifth embodiment.

According to the fifth embodiment, a processing sequence executed by the data processor 11, the data processor 21, and the data processor 31 differs from the processing sequence executed by those of the first embodiment.

Figure 8:
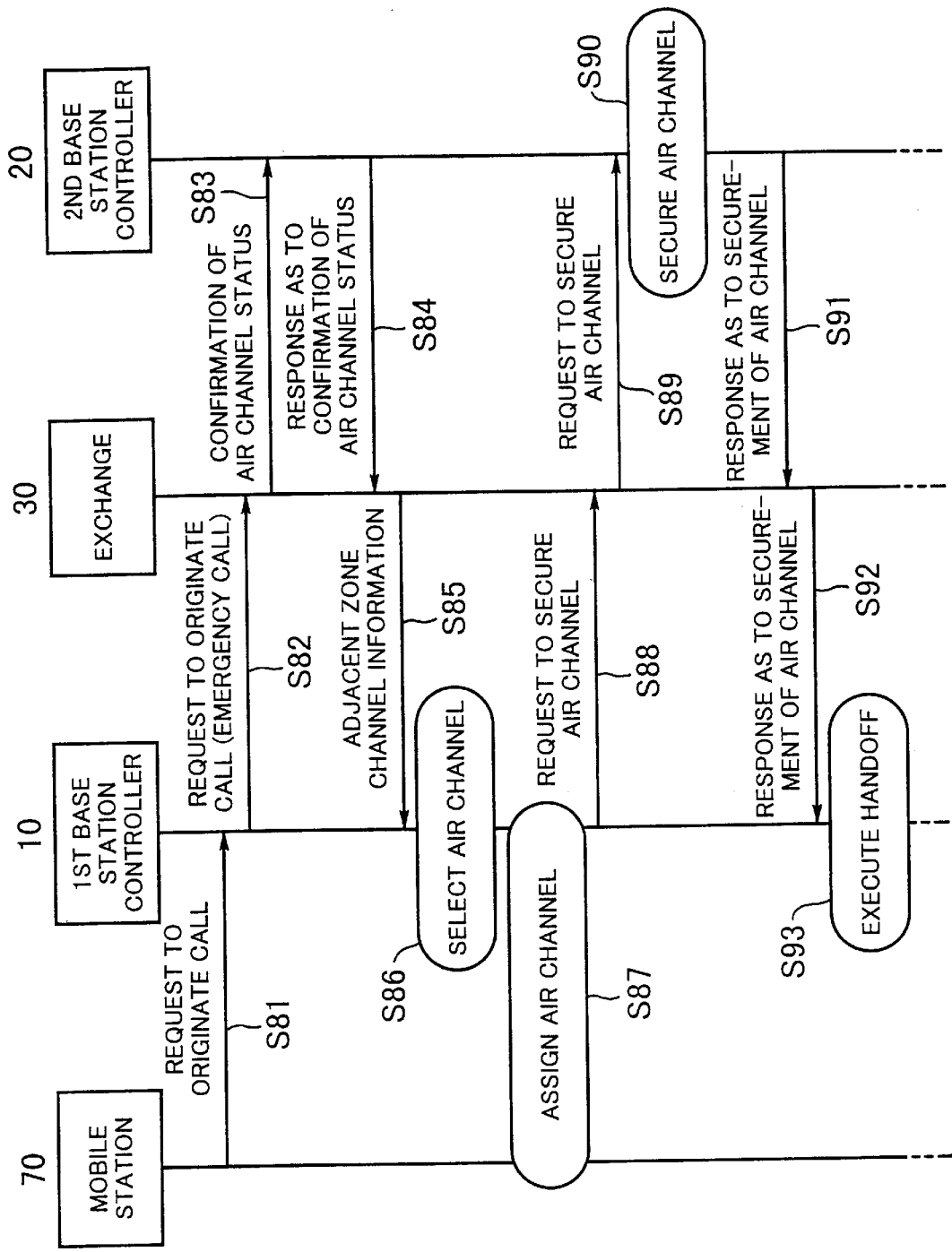
FIG. 8 is a sequence diagram of an emergency call connection process and a handoff process which are carried out by a mobile communication system according to a fifth embodiment of the present invention.

FIG. 8 shows an emergency call connection process and a handoff process which are carried out by the mobile communication system according to the fifth embodiment. These processes will be described below with respect to sequence steps represented by sequence numbers each with a prefix S.

When the first base station controller 10 receives a request to originate an emergency call from the mobile station 70 through the first base station 50 (S81), the first base station controller 10 transmits the request to originate an emergency call to the exchange 30 (S82).

The exchange 30 sends a confirmation message to a certain base station controller associated with a service zone adjacent to the service zone 51 of the first base station 50, requesting the certain base station controller to indicate presently idle radio channels that are available to the base station controlled by the certain base station controller (S83). The certain base station controller is a base station controller which controls a base station having a service zone adjacent to the service zone 51. In this case, the second base station controller 20 which is associated with the service zone 61 adjacent to the service zone 51 will be described below. If there are a plurality of base station controllers associated with respective service zones adjacent to the service zone 51, then sequence steps S83–S86, S88–S93 are executed with respect to each of those base station controllers.

The second base station controller 20 sends the exchange 30 a response message indicating presently idle radio channels that are available to the second base station 60 (S84). The exchange 30 transfers the information of the presently idle radio channels to the first base station controller 10 (S85).

The first base station controller 10 selects one of the presently idle radio channels that are available to the first base station 50. The selected idle radio channel is referred to as a "first channel". The first base station controller 10 also selects idle radio channels whose frequency is the same as the frequency of the first channel from the presently idle radio channels that are available to the second base station 60, and chooses one of the selected idle radio channels (S86). The chosen idle radio channel is referred to as a "second channel". After the first base station controller 10 has selected radio channels whose frequency is the same as the frequency of the first channel, if all those selected radio channels are occupied and no idle radio channel is available, then the first base station controller 10 selects radio channels whose frequency is different from the frequency of the first channel, and chooses an idle radio channel from the selected radio channels. In this case, the chosen idle radio channel is also referred to as a "second channel".

The first channel is assigned between the mobile station 70 and the first base station 50, and a wired channel is assigned between the first base station controller 10 and the exchange 30. As a result, the mobile station 70 is connected through the first base station 50, the first base station controller 10, the exchange 30, and the public communication network 40 (which may be a private communication circuit) to a terminal of a called party, e.g., a terminal in a police station or a fire department, and starts communicating with the called party (S87).

After the above channels have been assigned, the first base station controller 10 sends a message to the exchange 30, requesting the securement of the second channel (S88). The exchange 30 transfers the message to the second base station controller 20 (S89). The second base station controller 20 then secures the second channel for the emergency call (S90). The second base station controller 20 will not allow the secured second channel to be used by other mobile stations until it receives a notice to cancel the securement of the second channel.

The sequence steps S91–S93 are identical to the sequence steps S7–S9 shown in FIG. 2, and will not be described in detail below. After the sequence step S93, the same sequence steps as the sequence steps S10–S17 shown in FIG. 3 are executed. Therefore, these sequence steps will not be described and illustrated in detail below.

According to the fifth embodiment, as described above, when a mobile station moves from a service zone into another service zone while engaging in an emergency call, the emergency call is maintained in the other service zone even if the radio channels are congested in the other service zone.

In the fifth embodiment, in the sequence steps S81, S82, when the first base station controller 10 receives a request to originate an emergency call from the mobile station 70, the first base station controller 10 immediately transmits the request to originate an emergency call to the exchange 30. However, such a process may be modified as follows: Two levels according to different degrees of emergency are established for emergency calls. Only when the mobile station 70 transmits a request to originate an emergency call of the level corresponding to the higher degree of emergency, the first base station controller 10 transmits the request to originate an emergency call to the exchange 30.

In the fifth embodiment, the mobile communication system comprises a CDMA mobile communication system. Therefore, an idle radio channel whose frequency is the same as the frequency of the radio channel (first channel) assigned between the mobile station 70 and the first base station 50 is secured at first in the sequence step S86. However, the principles of the fifth embodiment are not limited to a CDMA mobile communication system, but are also applicable to a general mobile communication system. If the fifth embodiment is applied to a general mobile communication system, then an idle radio channel whose frequency different from the frequency of the first channel is secured at first in the sequence step S86, and a handoff is carried out in the sequence step S93.

A mobile communication system according to a sixth embodiment of the present invention will be described below.

The mobile communication system according to the sixth embodiment is basically the same in structure as the mobile communication system according to the first embodiment. Therefore, the description of the mobile communication system according to the first embodiment shown in FIG. 1 is referred to for the mobile communication system according to the sixth embodiment.

According to the sixth embodiment, a processing sequence executed by the data processor 11, the data processor 21, and the data processor 31 differs from the processing sequence executed by those of the first embodiment.

Figure 9:
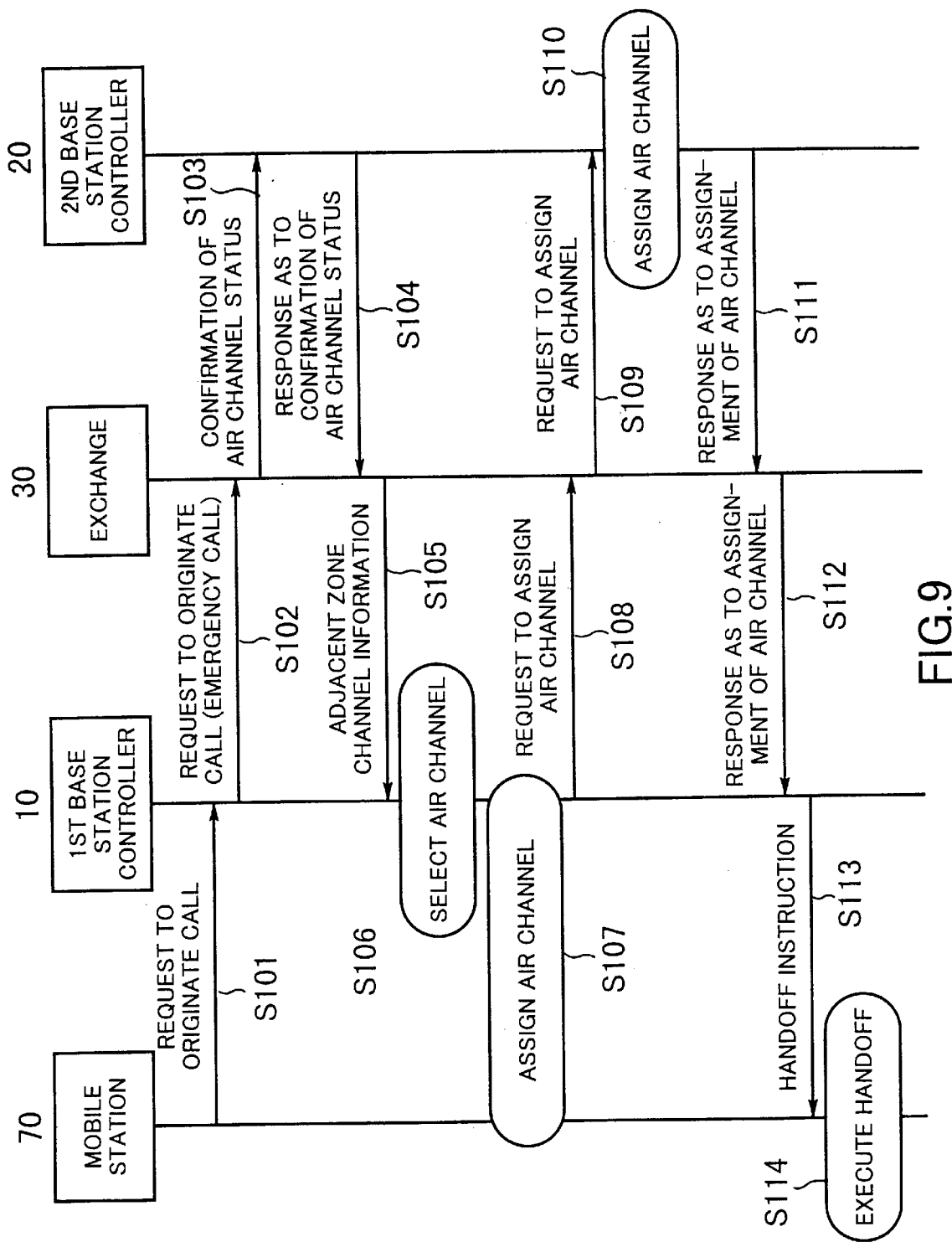
FIG. 9 is a sequence diagram of an emergency call connection process and a handoff process which are carried out by a mobile communication system according to a sixth embodiment of the present invention.

FIG. 9 shows an emergency call connection process and a handoff process which are carried out by the mobile communication system according to the sixth embodiment. These processes will be described below with respect to sequence steps represented by sequence numbers each with a prefix S.

When the first base station controller 10 receives a request to originate an emergency call from the mobile station 70 through the first base station 50 (S101), the first base station controller 10 transmits the request to originate an emergency call to the exchange 30 (S102).

The exchange 30 sends a confirmation message to a certain base station controller associated with a service zone adjacent to the service zone 51 of the first base station 50, requesting the certain base station controller to indicate presently idle radio channels that are available to the base station controlled by the certain base station controller (S103). The certain base station controller is a base station controller which controls a base station having a service zone adjacent to the service zone 51. In this case, the second base station controller 20 which is associated with the service zone 61 adjacent to the service zone 51 will be described below. If there are a plurality of base station controllers associated with respective service zones adjacent to the service zone 51, then sequence steps S103–S106, S108–S112 are executed with respect to each of those base station controllers.

The second base station controller 20 sends the exchange 30 a response message indicating presently idle radio channels that are available to the second base station 60 (S104). The exchange 30 transfers the information of the presently idle radio channels to the first base station controller 10 (S105).

The first base station controller 10 selects one of the presently idle radio channels that are available to the first base station 50. The selected idle radio channel is referred to as a "first channel". The first base station controller 10 also selects idle radio channels whose frequency is the same as the frequency of the first channel from the presently idle radio channels that are available to the second base station 60, and chooses one of the selected idle radio channels (S106). The chosen idle radio channel is referred to as a "second channel".

The first channel is assigned between the mobile station 70 and the first base station 50, and a wired channel is assigned between the first base station controller 10 and the exchange 30. As a result, the mobile station 70 is connected through the first base station 50, the first base station controller 10, the exchange 30, and the public communication network 40 (which may be a private communication circuit) to a terminal of a called party, e.g., a terminal in a police station or a fire department, and starts communicating with the called party (S107).

After the above channels have been assigned, the first base station controller 10 sends a message to the exchange 30, requesting the assignment of the second channel (S108). The exchange 30 transfers the message to the second base station controller 20 (S109). The second base station controller 20 makes a radio connection between the mobile station 70 and the second base station 60 through the second channel (S110). The mobile station 70 is now able to communicate with the terminal of the called party through the second base station 60, the second base station controller 20, the exchange 30, and the public communication network 40 (which may be a private communication circuit). The mobile station 70 does not communicate with the called party yet.

Then, the second base station controller 20 sends a response message indicating that the assignment of an idle radio channel is completed to the exchange 30 (S111), which transfers the response message to the first base station controller 10 (S112). In response to the response message, the first base station controller 10 sends a handoff instruction to the mobile station 70 (S113).

The mobile station 70 then carries out a handoff (S114). That is, since the radio channels having the same frequency have been established between the mobile station 70 and the base stations, the mobile station 70 can communicate with the first base station 50, the second base station 60, and base stations controlled by other base station controllers simultaneously. The mobile station 70 selects a communication path of better communication quality from the communication paths thus available. Accordingly, an undesirable instantaneous communication cutoff can be avoided upon a handoff. If the mobile station 70 moves into the service zone 61, then the radio channel between the mobile station 70 and the second base station 60 is selected as a communication path of best communication quality.

In the sixth embodiment, in the sequence steps S101, S102, when the first base station controller 10 receives a request to originate an emergency call from the mobile station 70, the first base station controller 10 immediately transmits the request to originate an emergency call to the exchange 30. However, such a process may be modified as follows: Two levels according to different degrees of emergency are established for emergency calls. Only when the mobile station 70 transmits a request to originate an emergency call of the level corresponding to the higher degree of emergency, the first base station controller 10 transmits the request to originate an emergency call to the exchange 30.

According to the present invention, as described above, when the channel securement requesting means of the first base station controller receives a request to originate an emergency call from a mobile station in a service zone, the channel securement requesting means requests the second base station controller associated with an adjacent service zone to secure a radio channel. In the second base station controller, the securing means secures an idle radio channel. When the mobile station which is engaging in the emergency call moves into the service zone with which the second base station controller is associated and needs a handoff, the connection requesting means in the first base station controller requests the second base station controller to make a radio connection through the radio channel which has been secured.

Consequently, even while the radio channels are being congested in the service zone into which the mobile station moves, the emergency call from the mobile station is maintained in the service zone regardless of the congestion.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An emergency call control apparatus for a mobile communication system including at least a first base station having a service zone, a first base station controller for controlling the first base station, an exchange for mobile communications which is connected to the first base station controller, a second base station having a service zone adjacent to the service zone of the first base station, and a second base station controller for controlling the second base station, the second base station controller being connected to the exchange, comprising:

channel securement requesting means in said first base station controller, for requesting at least said second base station controller through the exchange to secure a radio channel when a request to originate an emergency call is received from a mobile station through said first base station;

securing means in said second base station controller, for securing an idle radio channel according to a request from said channel securement requesting means; and connection requesting means in said first base station controller, for requesting said second base station controller through said exchange to make a radio connection between said mobile station and said second base station through a radio channel secured by said securing means when said mobile station needs a handoff to said second base station.

2. An emergency call control apparatus according to claim 1, wherein said mobile communication system comprises a CDMA mobile communication system, said securing means comprising means for seeking and securing an idle radio channel among radio channels having the same frequency as the frequency of a radio channel used between said mobile station and said first base station;

said mobile station having means for effecting radio communication with both said first base station and said second base station upon the handoff.

3. An emergency call control apparatus according to claim 1, wherein said mobile communication system comprises a CDMA mobile communication system, said securing means comprising means for seeking an idle radio channel among radio channels having the same frequency as the frequency of a radio channel used between said mobile station and said first base station, and for, if said idle radio channel is not found, seeking and securing an idle radio channel among radio channels having a frequency different from the frequency of a radio channel used between said mobile station and said first base station;

said mobile station having means for starting radio communication with said second base station after cutting off radio communication with said first base station upon the handoff.

4. An emergency call control apparatus according to claim 1, wherein said channel securement requesting means comprises means for requesting at least said second base station controller through the exchange to secure a radio channel when said request to originate an emergency call and a request to secure a radio channel for an emergency call in a service zone adjacent to the service zone of said first base station are received.

5. An emergency call control apparatus for a mobile communication system including at least a first base station having a service zone, a first base station controller for controlling the first base station, an exchange for mobile communications which is connected to the first base station controller, a second base station having a service zone adjacent to the service zone of the first base station, and a second base station controller for controlling the second base station, the second base station controller being connected to the exchange, comprising:

confirming means in said exchange, for confirming how radio channels are used in at least said first base station controller and said second base station controller when a request to originate an emergency call is received from a mobile station through said first base station and said first base station controller;

channel securement requesting means in said exchange, for selecting one of idle radio channels confirmed in said second base station controller by said confirming means, and requesting, through the exchange, said second base station controller to secure said selected one of the idle radio channels;

securing means in said second base station controller, for securing a requested radio channel according to the request from said channel securement requesting means; and connection requesting means in said first base station controller, for requesting said second base station controller through said exchange to make a radio connection between said mobile station and said second base station through the radio channel secured by said securing means when said mobile station needs a handoff to said second base station.

6. An emergency call control apparatus according to claim 5, wherein said mobile communication system comprises a CDMA mobile communication system, said channel securement requesting means comprising means for seeking and securing an idle radio channel among radio channels having the same frequency as the frequency of a radio channel used between said mobile station and said first base station;

said mobile station having means for effecting radio communication with both said first base station and said second base station upon the handoff.

7. An emergency call control apparatus according to claim 5, wherein said mobile communication system comprises a CDMA mobile communication system, said channel securement requesting means comprising means for seeking an idle radio channel among radio channels having the same frequency as the frequency of a radio channel used between said mobile station and said first base station, and, if said idle radio channel is not found, for seeking and securing an idle radio channel among radio channels having a frequency different from the frequency of a radio channel used between said mobile station and said first base station;

said mobile station having means for starting radio communication with said second base station after cutting off radio communication with said first base station upon the handoff.

8. An emergency call control apparatus according to claim 5, wherein said confirming means comprises means for confirming how radio channels are used in at least said first base station controller and said second base station controller when said request to originate an emergency call and a request to secure a radio channel for an emergency call in a service zone adjacent to the service zone of said first base station are received.

9. An emergency call control apparatus for a mobile communication system including at least a first base station having a service zone, a first base station controller for controlling the first base station, an exchange for mobile communications which is connected to the first base station controller, a second base station having a service zone adjacent to the service zone of the first base station, and a second base station controller for controlling the second base station, the second base station controller being connected to the exchange, comprising:

connection requesting means in said first base station controller, for requesting said second base station controller through said exchange to make a radio connection between a mobile station and said second base station when a request to originate an emergency call is received from said mobile station through said first base station; and connecting means in said second base station controller, for seeking an idle radio channel according to a request from said connection requesting means, and making a radio connection between said mobile station and said second base station through the idle radio channel sought by said connecting means.

10. An emergency call control apparatus according to claim 9, wherein said mobile communication system comprises a CDMA mobile communication system, said connecting means comprising means for seeking an idle radio channel among radio channels having the same frequency as the frequency of a radio channel used between said mobile station and said first base station;

said mobile station having means for effecting radio communication with both said first base station and said second base station upon a handoff.

11. An emergency call control apparatus according to claim 9, wherein said connection requesting means comprises means for requesting at least said second base station controller through the exchange to make a radio connection between said mobile station and said second base station when said request to originate an emergency call and a request to secure a radio channel for an emergency call in a service zone adjacent to the service zone of said first base station are received.

12. An emergency call control apparatus for a mobile communication system including at least a first base station having a service zone, a first base station controller for controlling the first base station, an exchange for mobile communications which is connected to the first base station controller, a second base station having a service zone adjacent to the service zone of the first base station, and a second base station controller for controlling the second base station, the second base station controller being connected to the exchange, comprising:

confirming means in said exchange, for confirming how radio channels are used in at least said first base station controller and said second base station controller when a request to originate an emergency call is received from a mobile station through said first base station and said first base station controller;

connection requesting means in said exchange, for selecting one of idle radio channels confirmed in said second base station controller by said confirming means, and requesting said second base station controller to make a radio connection between said mobile station and said second base station through said selected one of the idle radio channels; and connecting means in said second base station controller, for making a radio connection between said mobile station and said second base station through a requested radio channel according to a request from said connection requesting means.

13. An emergency call control apparatus according to claim 12, wherein said mobile communication system comprises a CDMA mobile communication system, said connection requesting means comprising means for seeking an idle radio channel among radio channels having the same frequency as the frequency of a radio channel used between said mobile station and said first base station;

said mobile station having means for effecting radio communication with both said first base station and said second base station upon a handoff.

14. An emergency call control apparatus according to claim 12, wherein said confirming means comprises means for confirming how radio channels are used in at least said first base station controller and said second base station controller when said request to originate an emergency call and a request to secure a radio channel for an emergency call in a service zone adjacent to the service zone of said first base station are received.

15. An emergency call control apparatus for a mobile communication system including at least a first base station having a service zone, a first base station controller for controlling the first base station, an exchange for mobile communications which is connected to the first base station controller, a second base station having a service zone adjacent to the service zone of the first base station, and a second base station controller for controlling the second base station, the second base station controller being connected to the exchange, comprising:

information collecting means in said exchange, for collecting information on how radio channels are used in at least said second base station controller and transmitting the information to said first base station controller when a request to originate an emergency call is received from a mobile station through said first base station and said first base station controller;

channel securement requesting means in said first base station controller, for selecting one of idle radio channels in said second base station controller based on the information from said information collecting means, and requesting said second base station controller through the exchange to secure said selected one of the idle radio channels;

securing means in said second base station controller, for securing a requested radio channel according to a request from said channel securement requesting means; and connection requesting means in said first base station controller, for requesting said second base station controller through said exchange to make a radio connection between said mobile station and said second base station through a radio channel secured by said securing means when said mobile station needs a handoff to said second base station.

16. An emergency call control apparatus according to claim 15, wherein said mobile communication system comprises a CDMA mobile communication system, said channel securement requesting means comprising means for seeking and securing an idle radio channel among radio channels having the same frequency as the frequency of a radio channel used between said mobile station and said first base station;

said mobile station having means for effecting radio communication with both said first base station and said second base station upon the handoff.

17. An emergency call control apparatus according to claim 15, wherein said mobile communication system comprises a CDMA mobile communication system, said channel securement requesting means comprising means for seeking an idle radio channel among radio channels having the same frequency as the frequency of a radio channel used between said mobile station and said first base station, and for, if said idle radio channel is not found, seeking and securing an idle radio channel among radio channels having a frequency different from the frequency of a radio channel used between said mobile station and said first base station;

said mobile station having means for starting radio communication with said second base station after cutting off radio communication with said first base station upon the handoff.

18. An emergency call control apparatus according to claim 15, wherein said information collecting means comprises means for collecting information on how radio channels are used in at least said first base station controller and said second base station controller and transmitting the information to said first base station controller when said request to originate an emergency call and a request to secure a radio channel for an emergency call in a service zone adjacent to the service zone of said first base station are received.

19. An emergency call control apparatus for a mobile communication system including at least a first base station having a service zone, a first base station controller for controlling the first base station, an exchange for mobile communications which is connected to the first base station controller, a second base station having a service zone adjacent to the service zone of the first base station, and a second base station controller for controlling the second base station, the second base station controller being connected to the exchange, comprising:

information collecting means in said exchange, for collecting information on how radio channels are used in at least said second base station controller and transmitting the information to said first base station controller when a request to originate an emergency go call is received from a mobile station through said first base station and said first base station controller;

connection requesting means in said first base station controller, for selecting one of idle radio channels in said second base station controller based on the information from said information collecting means, and requesting said second base station controller through the exchange to make a radio connection between said mobile station and said second base station through said selected one of the idle radio channels; and connecting means in said second base station controller, for making a radio connection between said mobile station and said second base station through a requested radio channel according to a request from said connection requesting means.

20. An emergency call control apparatus according to claim 19, wherein said mobile communication system comprises a CDMA mobile communication system, said connection requesting means comprising means for seeking an idle radio channel among radio channels having the same frequency as the frequency of a radio channel used between said mobile station and said first base station;

said mobile station having means for effecting radio communication with both said first base station and said second base station upon a handoff.

21. An emergency call control apparatus according to claim 19, wherein said information collecting means comprises means for collecting information on how radio channels are used in at least said first base station controller and said second base station controller and transmitting the information to said first base station controller when said request to originate an emergency call and a request to secure a radio channel for an emergency call in a service zone adjacent to the service zone of said first base station are received.

* * * * *